United States Patent [19]

Allart et al.

[11] Patent Number: 5,220,790
[45] Date of Patent: Jun. 22, 1993

[54] ASSEMBLY OF A PRESSURIZED FLUID MOTOR WITH MULTIPLE CUBIC CAPACITIES AND A BRAKE ASSOCIATED THEREWITH

[75] Inventors: Bernard Allart, Crepy en Valois; Alain Noel, Villeneuve-sur-Verberie, both of France

[73] Assignee: Poclain Hydraulics, Verberie, France

[21] Appl. No.: 842,060

[22] Filed: Feb. 26, 1992

[30] Foreign Application Priority Data

Mar. 4, 1991 [FR] France ............... 91 02557

[51] Int. Cl.⁵ ............................................. F15B 11/04
[52] U.S. Cl. ................................... 60/435; 60/493
[58] Field of Search .............. 60/435, 436, 439, 442, 60/493

[56] References Cited

U.S. PATENT DOCUMENTS

| | | | |
|---|---|---|---|
| 2,697,329 | 12/1954 | Eichler | 60/436 |
| 2,789,542 | 4/1957 | Kaay | 60/436 |
| 3,638,772 | 2/1972 | Ninomiya | 60/436 X |
| 3,662,550 | 5/1972 | Lichtfuss | 60/436 X |
| 4,317,331 | 3/1982 | Aruga et al. | 60/436 |
| 4,557,109 | 12/1985 | Nagahara et al. | 60/436 |
| 4,858,435 | 8/1989 | Ikeda | 60/442 X |
| 4,891,942 | 1/1989 | Schwarz | 60/442 X |

Primary Examiner—Edward K. Look
Assistant Examiner—Hoang Nguyen

[57] ABSTRACT

The assembly of a fluid motor with two cubic capacities and of a brake which is coupled thereto, is disclosed. According to the invention, the large cubic capacity of the motor can be selected only when the brake is in its brake-release configuration. One application of the invention is the production of a "braked" motor provided with a relatively small, but operationally reliable brake.

4 Claims, 6 Drawing Sheets

ASSEMBLY OF A PRESSURIZED FLUID MOTOR WITH MULTIPLE CUBIC CAPACITIES AND A BRAKE ASSOCIATED THEREWITH

FIELD OF THE INVENTION

The present invention relates to an assembly of a pressurized fluid motor with multiple cubic capacities and of a brake associated therewith.

BACKGROUND OF THE INVENTION

The assembly is already known of a pressurized fluid motor having at least two distinct operational cubic capacities, comprising a driven member, such as a driving shaft, and of a brake coupled to said driven member of the pressurized fluid motor, said pressurized fluid motor, such as a hydraulic motor, being capable of being placed in two distinct configurations, the first corresponding to a large operational cubic capacity and, for a determined value of the pressure of the supply fluid, to a high driving torque, and the second configuration corresponding to a small operational cubic capacity, less than said large operational cubic capacity, and, for said determined value of the pressure of the supply fluid, to a low driving torque, less than said high driving torque, said pressurized fluid motor further comprising a cubic capacity selector having a mobile member with at least two positions, the first of the two positions placing the pressurized fluid motor in its first configuration and the second position placing it in the second configuration, said mobile member being coupled to a first elastic return means which tends to place it in its second position and to a first pressurized fluid jack capable of being supplied with fluid under pressure, whose effect is antagonistic of that of said first elastic return member, whilst the brake comprises a braking control device, which comprises at least two positions, and which is coupled, on the one hand, to a second member for return into braking position, on the other hand, to a second jack, of antagonisitc effect, comprising a braking-release chamber capable of being placed in communication with a source of fluid under pressure, said braking control member presenting two particular positions, a first corresponding to the action of braking and to the predominance of the return effect of the second return member, and a second position corresponding to the effective placing in communication of the braking-release chamber with a source of pressurized fluid, to the predominance of the effect of the second jack and to braking-release control.

According to the known art, there is a risk of a user switching on the motor whilst the latter is placed in the configuration of its large cubic capacity, therefore for obtaining the high driving torque, without controlling braking release.

The braking torque developed by the brake is sufficient to maintain the vehicle immobile or to stop it if necessary—it is generally a hand—and safety brake—but is less than the high driving torque. In that case, the erroneous manoeuvre of the user firstly does not prevent the motor from driving the vehicle, which is a risk of accident, particularly of persons, and also causes the brake linings to rub on the mobile member of the brake, which overheats them, leading to deterioration thereof.

It is possible to overcome these drawbacks by choosing a brake developing a braking torque greater than the high driving torque. This solution leads to the choice of a brake which is much more cumbersome and expensive than a conventional hand—and safety brake.

It is an object of the present invention to remedy this state of affairs by providing that, as long as the brake is in its braking configuration, the motor is automatically placed in its configuration of small cubic capacity, therefore of low driving torque. In that case, it suffices to choose a brake of which the braking torque is greater than said low driving torque so that any untimely drive of the vehicle, with the brake applied, is avoided.

SUMMARY OF THE INVENTION

To that end, according to the invention, the following features have been concommitantly adopted: a) the mobile member of the cubic capacity selector is in addition coupled to a third pressurized fluid brake which is capable of being supplied with fluid under pressure and whose effect is antagonistic of that of said first jack; b) the first jack and the braking-release chamber of the second jack are capable of being placed in communication with the same source of pressurized fluid; c) the resultant, on the mobile member of the cubic capacity selector, of the antagonistic efforts of the first elastic return member and of the first jack, when the pressure of the fluid contained in the braking-release chamber is zero, places said mobile member in its second position, whatever the value of the pressure of the fluid of the third jack; d) the resultant, on the mobile member of the cubic capacity selector, of the antagonistic efforts of the first elastic return member, and of the first jack, when the pressure of the fluid contained in the braking-release chamber is equal to a nominal braking-release pressure which controls braking release, and of the third jack, then connected to an enclosure substantially without pressure, places said mobile member in its first position; e) the immobilization torque of the driven member of the pressurized fluid motor, generated by the brake when the braking control member is placed in its first position, is greater than the maximum value of said low driving torque.

The following advantageous arrangements are also preferably adopted:

the resultant, on the mobile member of the cubic capacity selector, of the antagonistic efforts of the first elastic return member, and of the first jack, when the pressure of the fluid contained in the braking-release chamber is equal to a nominal braking-release pressure which controls braking release, and of the third jack, then connected to an enclosure under pressure, places said mobile member in its second position;

the brake being of the multiple disc type comprising a plurality of discs contained in a disc chamber, the braking-release chamber is constituted by the disc chamber itself.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
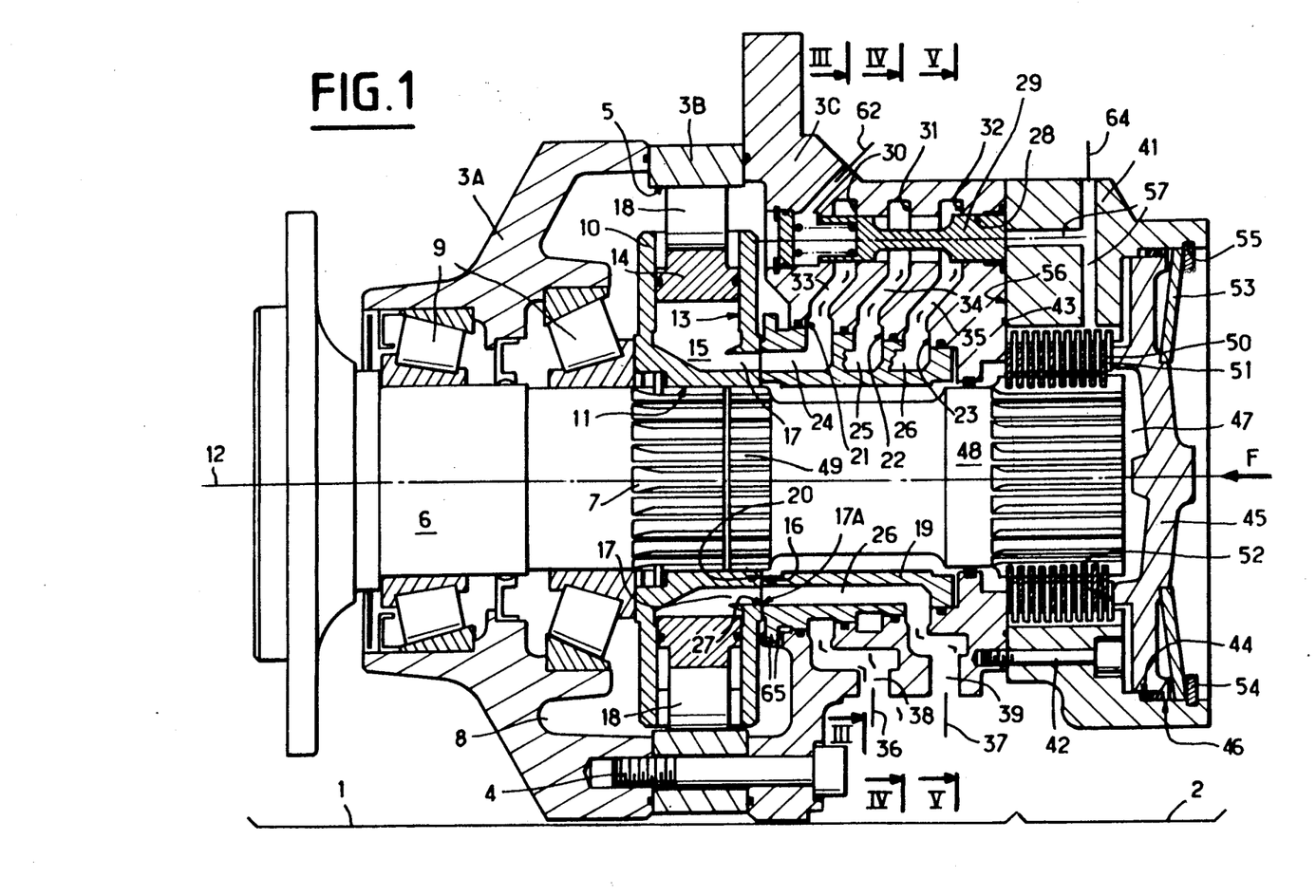
FIG. 1 is an axial section through a motor according to the invention.

Referring now to the drawings, the assembly of FIG. 1 comprises a hydraulic motor 1 and a brake 2 with multiple discs.

Motor 1 comprises:

a casing in three parts 3A, 3B, 3C assembled by screws 4, the inner periphery of the intermediate part 3B constituting a lobed cam 5, and said casing defining an enclosure 8;

a driving shaft 6 of which an inner end is provided with splines 7, and which is mounted to rotate with respect to the casing, about a geometrical axis 12, by means of conical roller bearings 9 interposed between the driving shaft 6 and part 3A of the casing;

a cylinder-block 10 which comprises central splines 11 which allow assembly thereof on the driving shaft 6 and which cooperate with splines 7 of the driving shaft to render the cylinder block 10 fast, with respect to rotation, with said driving shaft 6;

cylinders 13 which are made radially in the cylinder block 10 and regularly spaced apart angularly;

pistons 14 mounted to slide in the cylinders 13, one piston 14 per cylinder 13, defining inside each cylinder a working chamber 15 which communicates with a plane, called communication face 16, that the cylinder-block comprises, by means of cylinder conduit 17, the various cylinder conduits opening out in the communication face 16 via orifices 17A centred on the same circle and regularly spaced apart angularly, and the communication face 16 being perpendicular to axis 12;

rollers 18 mounted, one on each piston 14, and placed in abutment on the cam 5;

an internal fluid distributor valve 19, mounted coaxial to axis 12, provided with a plane distribution face 20, which is in tight abutment on the communication face 16;

three grooves 21, 22, 23 made in part 3C of the casing, coaxial to axis 12;

three groups of conduits: three conduits 24, connected to groove 21; three conduits 25, connected to groove 22; and six conduits 26 connected to groove 23; these various conduits all open out in the distribution face 20 via orifices 27 centred on the same circle as orifices 17A of cylinder conduits so as to be able to be periodically placed in communication with each orifice 17A, and, also, regularly spaced apart angularly;

a cylindrical bore 28, made in part 3C of the casing, in which a cylindrical slide drawer 29 may slide, three grooves 30, 31, 32, made in this part 3C of the casing opening out into this bore 28 and being connected, by inner conduits 33, 34, 35 to the preceding grooves 21, 22, 23, respectively, and, grooves 21, 23 being connected to outer conduits 36, 37, groove 21 via inner conduit 38 to outer conduit 36, and groove 23 via inner conduit 39 to outer conduit 37;

the cylindrical slide drawer 29 comprises a groove 40 and is capable of being placed in two particular positions, a first position (FIG. 7) in which groove 40 places grooves 30 and 31 in communication, groove 32 being isolated, and a second position (FIGS. 1, 2 and 6) in which groove 40 places grooves 31 and 32 in communication, groove 30 being isolated.

Figure 6:
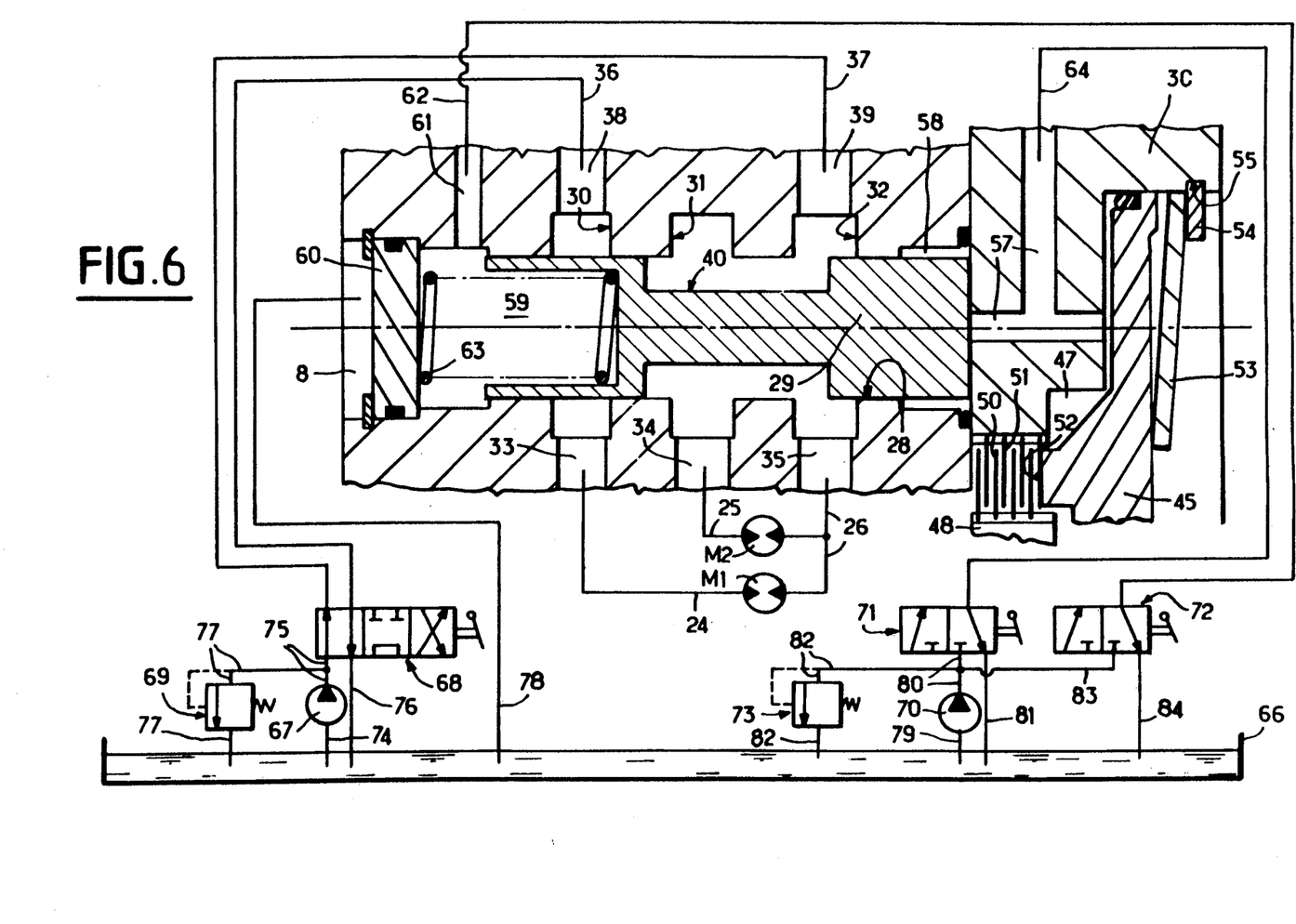
FIG. 6 is similar to FIG. 2, the control circuit being placed in a second configuration.

Multiple-disc brake 2 comprises:

a brake casing 41 which is fixed, by screws 42, on part 3C of the motor casing and is fastened thereto with tightness (43), and which comprises a bore 44 for the sliding assembly of a brake casing cover 45 whose radial periphery 46 is cylindrical, a chamber 47 being defined by said brake casing 41 and cover 45 said cover 45 operating as the piston of a second fluid jack, the fluid chamber of which is chamber 47;

a brake shaft 48 of which one end is provided with splines 49 cooperating with splines 11 of the cylinder block 10 in order to render fast with respect to rotation about axis 12, said brake shaft 48 and cylinder block 10, of which the other end supports brake discs 50 placed in alternate position with brake discs 51 mounted inside the brake casing 41, said brake shaft 48 being entirely contained inside the assembly of the enclosure 8 and the chamber 47, and a boss 52 being placed opposite the stack of brake discs 50-51;

a spring 53, constituted by an elastic washer, abutting on a stop segment 54 introduced in a groove 55 of the bore 44 of the brake casing 41 and tending to push the cover 45 in the direction of arrow F, and to place it in the configuration of FIGS. 1 and 6 in which the boss 52 abuts on the stack of brake discs 50-51 and effects braking of the brake shaft 48 with respect to the brake casing 41.

Bore 28 is defined, at a first of its ends, by the bearing face 56 of the brake casing 41 on part 3C of the motor casing, a conduit 57, inside the brake casing 41, opening out, on the one hand, in the end chamber 58 constituting said first end of the bore 28, on the other hand, in the chamber 47 containing the brake discs 50, 51, and connected to an outer conduit 64. The second end of the bore 28 opens out in a piloting chamber 59; which a stopper 60 hermetically isolates from the enclosure 8; which is in communication, by an inner conduit 61 made in part 3C of the motor casing, with an outer conduit 62; and which contains a spring 63 interposed between the stopper 60 and the slide drawer 29, whose effect tends to push said drawer 29 into its second position shown in FIGS. 1, 2 and 6. The end of the slide drawer 29 located in chamber 58 acts as the piston of a first fluid jack, and the end of the slide drawer 29 located in the chamber 59 acts as the piston of a third fluid jack.

The internal fluid distributor valve 19 is rendered fast, with respect to rotation about axis 12, with cam 5, by means of a catch/notch assembly 65.

Conduits 24, 25, 26 correspond, in pairs, to the various lobes of the cam 5, the pairs of conduits being distributed as indicated hereinafter: three pairs of conduits 24-26, regularly spaced apart angularly and, intercalated between these pairs of conduits 24-26, other pairs of two conduits 25-26, likewise regularly spaced apart angularly. The three pairs of conduits 24-26 and the corresponding lobes of cam 5 define a fictitious motor M1, the other three pairs of conduits 25-26 and the corresponding lobes of cam 5 defining another fictitious motor M2, the assembly of fictitious motors M1 and M2 constituting the real motor 1.

Figure 2:
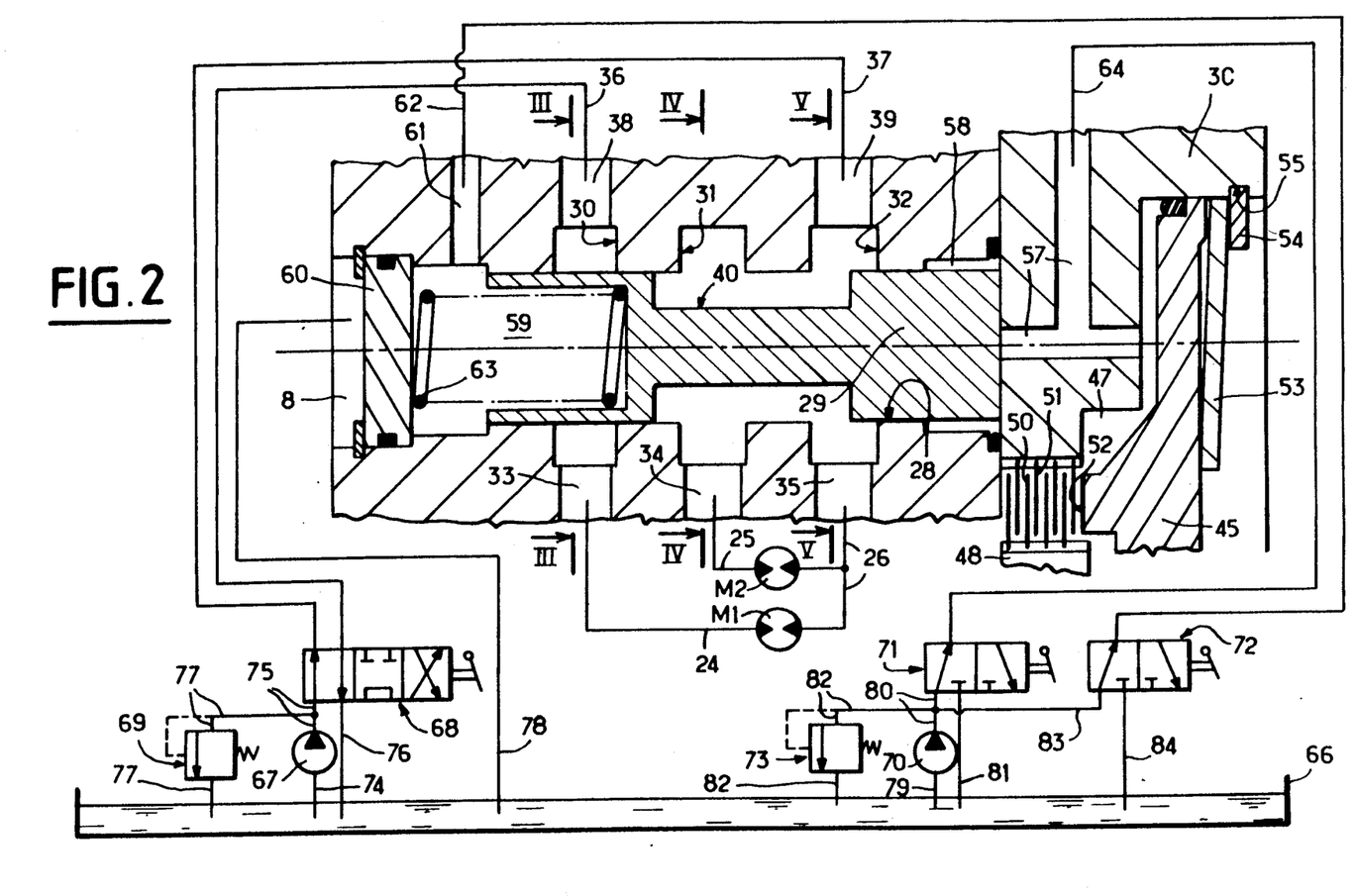
FIG. 2 is an axial section through a detail, enlarged, of constitution of FIG. 1, completed by the diagram of a control circuit of the motor placed in a first configuration.
Figure 3:
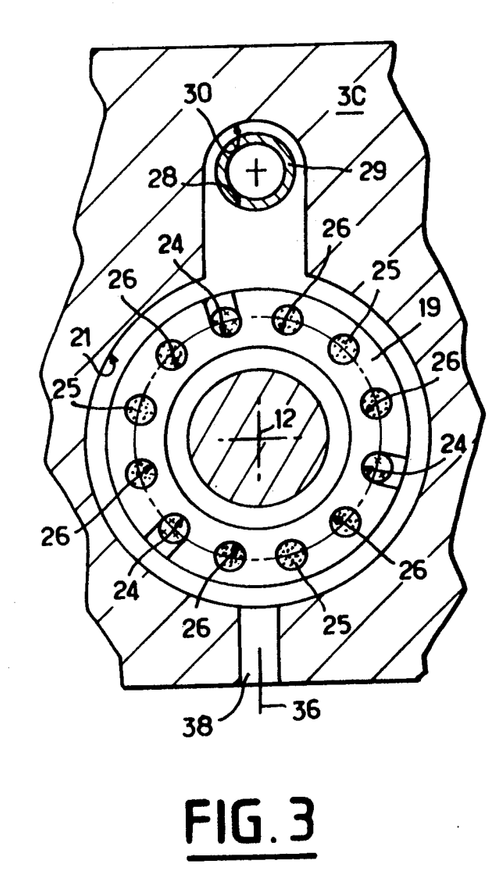
FIGS. 3, 4 and 5 are sections along III—III, IV—IV, V—V, respectively, of FIGS. 1 and 2.
Figure 4:
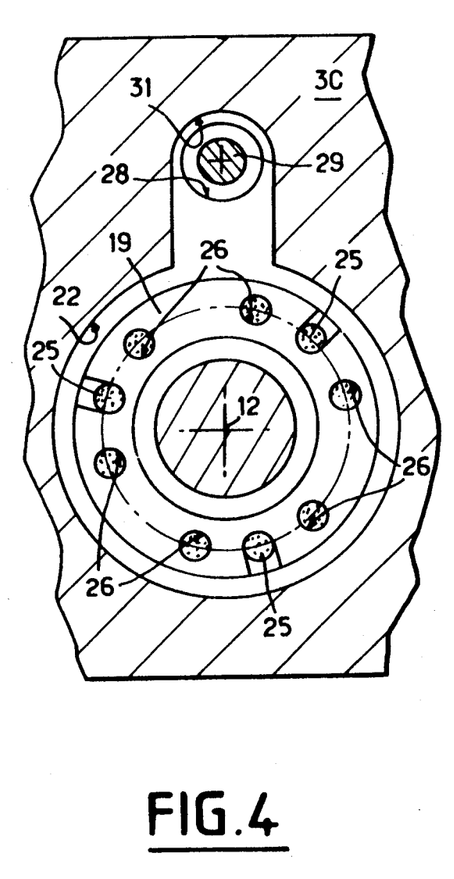
Figure 5:
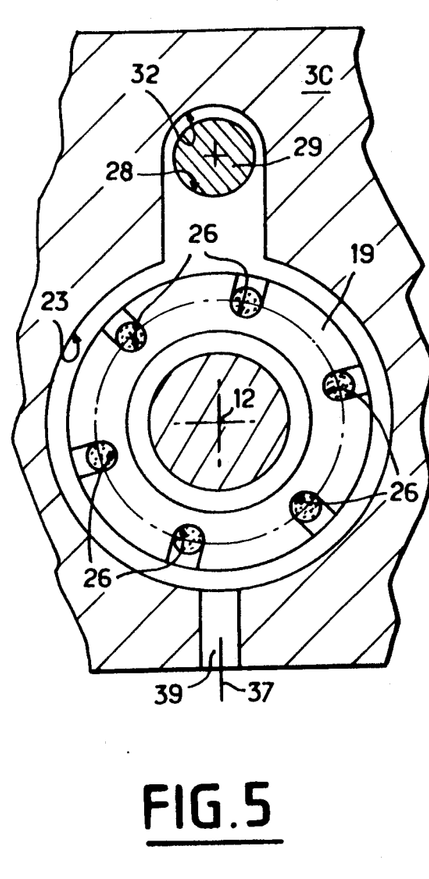
Figure 7:
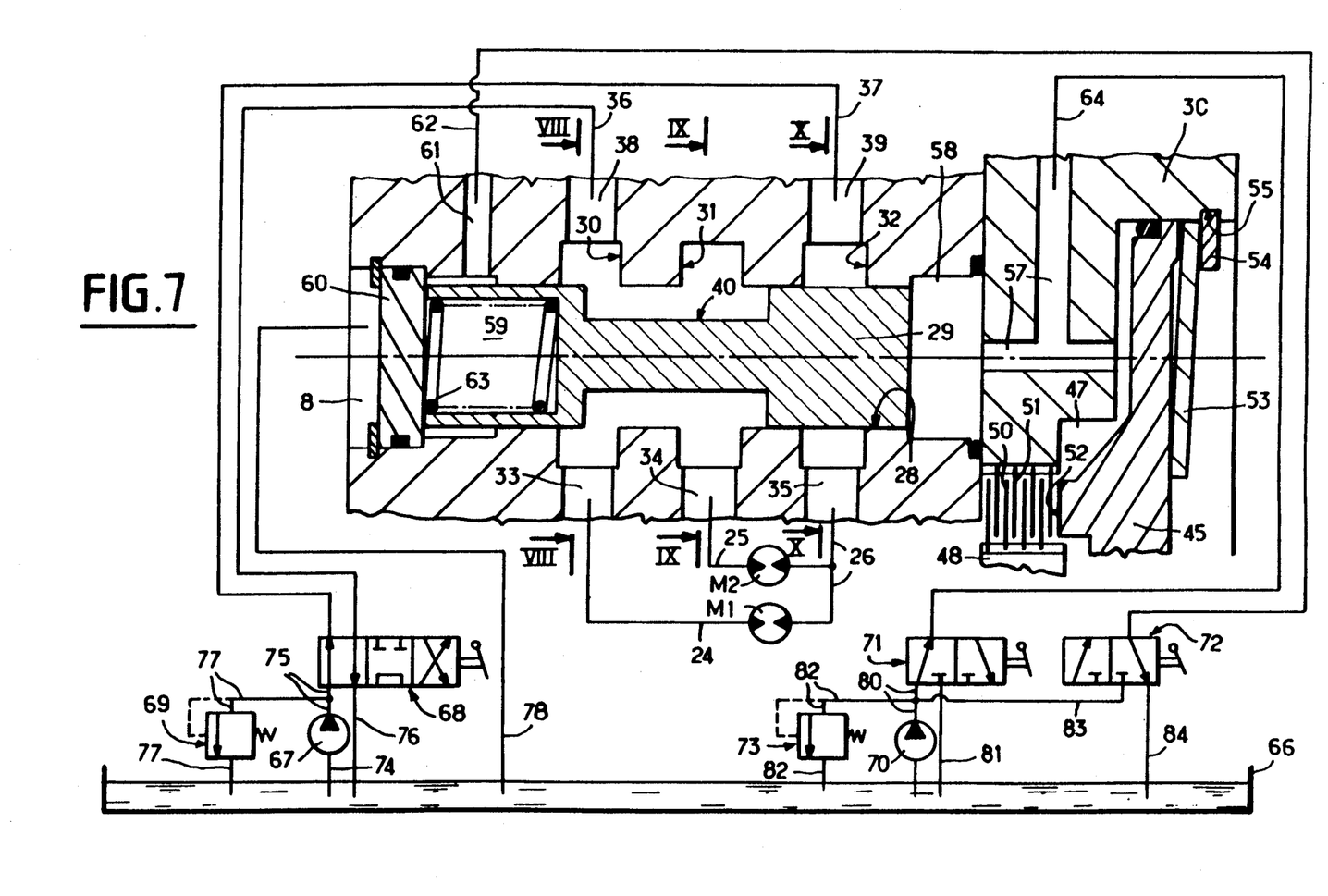
FIG. 7 is similar to FIG. 2, the control circuit being placed in a third configuration.
Figure 8:
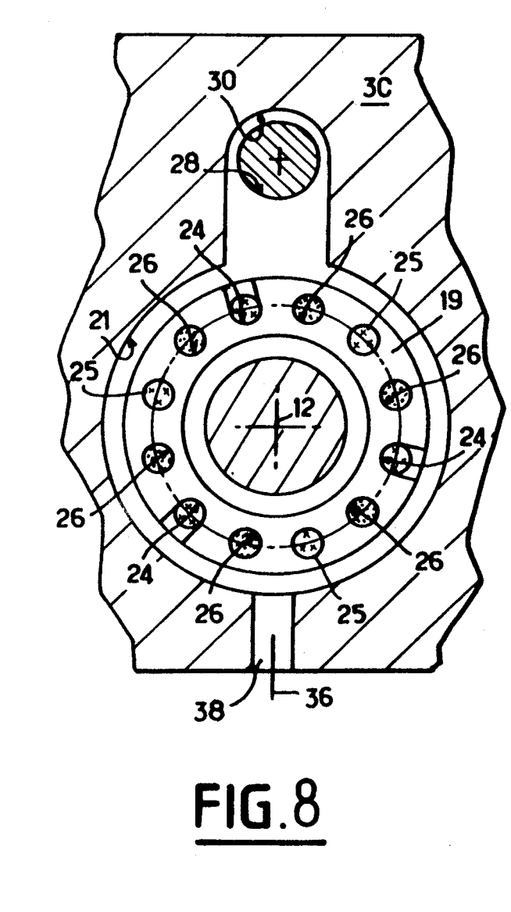
FIGS. 8, 9 and 10 are sections along VIII—VIII, IX—IX and X—X respectively of FIG. 7.
Figure 9:
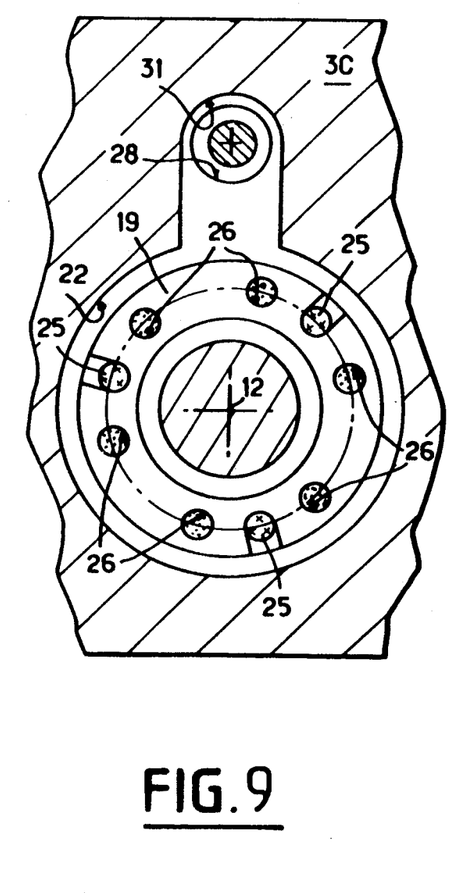
Figure 10:
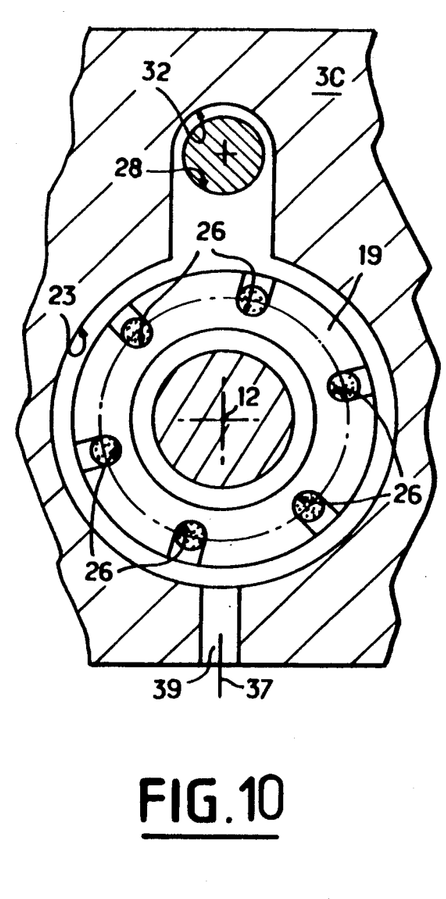

FIGS. 2, 6 and 7 show the diagram of the supply and control circuit of the motor 1/brake 2 assembly which has just been described.

This circuit comprises:

a pressure-less fluid reservoir 66;

a principal pump 67 for supplying the motor 1 with pressurized fluid;

a first, three-way fluid distributor valve 68;

a first delivery valve 69 for protection against overpressures;

an auxiliary pump 70;

a second, two-way fluid distributor valve 71;

a third, two-way fluid distributor valve 72;

a second delivery valve 73 for protection against overpressures; and the following conduits:

conduits 36 and 37, connected to the first fluid distributor valve 68;

suction conduit 74 of the principal pump 67, connecting the latter to the fluid reservoir 66;

delivery conduit 75 of the principal pump 67, connecting the latter to the first fluid distributor valve 68;

a conduit 76 connecting this first fluid distributor valve 68 to the fluid reservoir 66;

a conduit 77 connecting the delivery conduit 75 to the fluid reservoir 66, the first delivery valve 69 being placed on said conduit 77;

a conduit 78 connecting the enclosure 8 to the fluid reservoir 66;

conduit 64, connected to the second fluid distributor valve 71;

suction conduit 79 of the auxiliary pump 70, connecting the latter to the fluid reservoir 66;

delivery conduit 80 of the auxiliary pump 70, connecting the latter to the second fluid distributor valve 71;

a conduit 81 connecting this second fluid distributor valve 71 to the fluid reservoir 66;

a conduit 82 connecting the delivery conduit 80 to the fluid reservoir 66, the second delivery valve 73 being placed on this conduit 82;

conduit 62, connected to the third fluid distributor valve 72;

a conduit 83 connecting the delivery conduit 80 of the auxiliary pump 70 to the third fluid distributor valve 72;

a conduit 84 connecting the third fluid distributor valve 72 to the fluid reservoir 66.

The three positions of the first fluid distributor valve 68 correspond:

the first position to the communications of conduits 75 and 37 and of conduits 36 and 76;

the second position to the communication of conduits 75 and 76 and to the obturations of conduits 36, 37; and the third position to the communications of conduits 75 and 36 and of conduits 37 and 76.

The two positions of the second fluid distributor 71 correspond:

the first position, to the communication of conduits 64 and 81 and to the obturation of conduit 80; and the second position to the communication of conduits 80 and 64 and to the obturation of conduit 81.

The two positions of the third fluid distributor valve 72 correspond:

the first position to the communication of conduits 62 and 84 and to the obturation of conduit 83; and the second position to the communication of conduits 83 and 62 and to the obturation of conduit 84.

It should be recalled that, like any hydraulic motor similar to the one described, but also like certain other fluid motors with multiple cubic capacities, the driving torque depends, for a determined delivery pressure of the fluid contained in conduit 75, on the value of the cubic capacity of this motor.

In the example shown, when the slide drawer 29 for selecting the cubic capacity is placed in its first position (FIG. 7) and the first fluid distributor valve 68 is placed in its first position, each pair of conduits 24-26 and 25-26 comprises one conduit 26 (there are six of them) which contains the pressurized fluid delivered by the principal pump 67 and conveyed via conduits 75, 37, 39 and 35 and one conduit 24 (there are three) or 25 (there are also three) connected to the fluid reservoir 66 by conduits 33-34, 38, 36 and 76. Finally, the cubic capacities of the two fictitious motors M1 and M2 are added together and the cubic capacity of motor 1 is the sum of the cubic capacities of M1 and M2: the motor functions with a large cubic capacity, to which corresponds a high driving torque GCM and, for a determined supply rate, a low speed of rotation of the driving shaft 6 when the brake 2 is in "released" configuration.

When, on the contrary, the slide drawer 29 for selecting the cubic capacity is placed in its second position (FIGS. 1, 2 and 6), each pair of conduits 24-26 further comprises one conduit 26 (there are three of them) containing the pressurized fluid delivered by the principal pump 67 and one conduit 24 (likewise three in number) connected to the fluid reservoir 66.

On the other hand, conduits 25, 26 (there are six in all) of the three pairs of conduits 25-26 are all connected together (and at the pressure of the fluid delivered by the principal pump 67). Only fictitious motor M1 is active, fictitious motor M2 being short-circuited. Motor 1 functions with a small cubic capacity, to which corresponds a low driving torque PCM, and a high speed of rotation, when brake 2 is in "released" configuration.

Brake 2 is in "braked" configuration (FIGS. 1, 6) or "released" configuration (FIGS. 2, 7), depending on whether the second fluid distributor valve 71 is in its first or in its second position respectively. When it is in "braked" configuration, i.e. when the chamber 47 which contains the brake discs 50 and 51 and which constitutes a brake-release chamber, contains a fluid without pressure and is connected to the fluid reservoir 66 via conduits 57, 64 and 81, the bearing of discs 50, 51 on one another, provoked by the thrust of the cover 45 generated by spring 53, develops a braking torque CF.

It should be observed here that the value CF of the braking torque is included between the values PCM and GCM of the low and high driving torques:

CF is greater than PCM and is therefore adapted to immobilize shafts 6 and 48 even when motor 1, placed in its small cubic capacity configuration, is supplied with pressurized fluid; and CF may be lower than GCM and, in the example shown, is lower than GCM.

Finally, the characteristic set forth hereinafter concerning the adjustment of the position of the slide drawer 29 inside the bore 28, must be noted.

Slide drawer 29 is subjected to the following three forces:

the thrust force F 63, developed by spring 63, which tends to place slide drawer 29 in its second position (the one shown in FIGS. 1, 2 and 6);

the force F 59 of the pressure of the fluid contained in chamber 59, which also tends to place slide drawer 29 in its second position and whose thrust is in a direction opposite arrow F; and the force F 58 of the pressure of the fluid contained in chamber 58, which tends to place slide drawer 29 in its first position (the one shown in FIG. 7) and whose thrust is in the same direction as arrow F.

Taking into account the dimensions chosen (here, equal transverse sections of the slide drawer 29 in chambers 58 and 59), the force F 63 of the spring 63 and since, when the second (71) and third (72) fluid distributor valves are placed in their respective second positions, the fluids contained in the chambers 58 and 59 have equal pressures, the following correspondences are made:

A) to the respective first positions of the second (71) and third (72) fluid distributors, there corresponds the configuration shown in FIG. 6, in which the forces F 59 and F 58 are zero (F 58 = F 59 = 0), the single force F 63 of the spring 63 placing the slide drawer 29 in its second position, the motor 1 in its second configuration of small cubic capacity, and the brake 2 being placed in braking configuration (single action of spring 53 on the cover 45 and on the stack of brake discs 50-51);

B) to the first position of the second fluid distributor valve 71 and to the second position of the third fluid distributor valve 72, there corresponds the configuration shown in FIG. 1 of motor 1 and of brake 2, in which the pressurized fluid delivered by the auxiliary pump 70 arrives in chamber 59, whilst chamber 58 contains a fluid at zero pressure (F 58 = 0): the slide drawer 29 is again placed in its second position, placing motor 1 again in its second configuration of small cubic capacity, and the brake 2 being placed in its braking configuration, therefore the motor 1/brake 2 assembly being placed in the same configuration as that described hereinabove under A);

C) to the second position of the fluid distributor valve 71 and to the first position of the third fluid distributor valve 72, there corresponds the configuration shown in FIG. 7, in which chamber 59 contains a fluid at zero pressure (F 59 = 0), whilst chamber 58 contains the fluid delivered by the auxiliary pump 70: force F 58 is greater than force F 63 of the spring, places the slide drawer 29 in its first position, and places motor 1 in its first configuration of large cubic capacity; finally, brake 2 being placed in its brake-release configuration, the action of the fluid contained in the chamber 47 predominates that of the spring 53 and pushes the cover 45 and the boss 52 out of bearing on the brake discs of the stack of brake discs 50, 51;

D) to the respective two positions of the second (71) and third (72) fluid distributor valves, there corresponds the configuration shown in FIG. 2, in which the forces F 58 and F 59 are equal and opposite and have a zero resultant, the force F 63 of spring 63 placing the slide valve 29 in its second position, the motor 1 in its second configuration of small cubic capacity, and the brake 2 being placed in its brake-release configuration, due to the predominance of the action of the pressurized fluid contained in chamber 47 on the cover 45 on the action of the spring 53.

It is easy to check that:

in configuration A), which is illustrated in FIG. 6, the user wishes to place motor 1 in large cubic capacity mode (third fluid distributor valve 72 in its first position) and in fact obtains the small cubic capacity mode, whilst brake 2 is in its braking configuration (chamber 47 in communication with reservoir 66): this is in accordance with the invention as, when the brake 2 is in braking configuration, only the small cubic capacity may be obtained, in order that the driving torque be equal to the low driving torque (PCM) and cannot drive the driving shaft 6 in rotation, the risk of deterioration of the brake discs 50, 51 thus being eliminated, due, of course, to the superiority of the braking torque CF with respect to the low driving torque PCM; moreover, a false manoeuvre which would inadvertently place the first fluid distributor valve in its first (or in its third position), as shown in FIG. 6), would have no effect on the driving shaft 6 which would remain immobilized by the brake 2, thus avoiding all risks of corporal accidents;

in configuration B), the user wishes to place motor 1 in its small cubic capacity mode, brake 2 being active in brake-release configuration; to that end, the user has placed the third fluid distributor valve 72 in its first position and motor 1 is effectively placed in its small cubic capacity configuration (FIG. 1). If the first fluid distributor valve 68 is placed in its second position, motor 1 is not supplied and shafts 6 and 48 remain immobilized by brake 2. If, on the contrary, the first fluid distributor valve 68 is placed in either one of its first and third positions, motor 1 is supplied with pressurized fluid, develops its low driving torque PCM, which, being lower than the braking torque CF, is inoperative, the braking torque CF maintaining shafts 6 and 48 immobile: this is very important as, on the one hand, concerning the operational safety, if the choice of the first or of the third position of the first fluid distributor valve 68 has been made inadvertently, further to a false manoeuvre, the device coupled to the driving shaft 6 remains at rest, which eliminates all risks of accident; on the other hand, the material is preserved from any damage, as the driving torque PCM cannot drive shafts 6 and 48, which avoids damaging the brake discs 50, 51, which are in abutment on one another in the braking configuration;

in the conventional configurations C) and D), the user has decided to control brake-release, which is effectively obtained, and has decided on the choice of the large cubic capacity of motor 1, which is effectively obtained (FIG. 7) or that of small cubic capacity of motor 1, which is also obtained (FIG. 2); of course, the manoeuvre of the first fluid distributor valve 68 makes it possible, as desired, to rotate the driving shaft 6 in one direction or in the other, or to control immobilization thereof (non-drive by motor 1).

In this way, whilst having provided a brake 2 whose braking torque CF may be lower than the high driving torque GCM, therefore a smaller and less expensive brake 2 than a brake having a braking torque greater than the high driving torque, the invention makes it possible to avoid this brake 2 being damaged by automatically placing motor 1 in its configuration of small cubic capacity (and low driving torque), when the configuration of the brake is that of braking, configuration in which the braking torque CF is sufficient to be greater than the driving torque (PCM). This is, of course, effected when the user chooses him/herself the configuration of the motor in its small cubic capacity (FIG. 1), but also, and in novel and original manner, when the user, having chosen the large cubic capacity mode, motor 1 is nonetheless placed in its configuration of small cubic capacity (FIG. 6).

In this latter case, only the voluntary control of brake-release (FIG. 7) makes it possible, the user having chosen large cubic capacity mode for motor 1, effectively to obtain the large cubic capacity configuration of said motor, this by the action of the pressure of the brake-release fluid contained in the chamber 47 which also acts in the chamber 58 and pushes slide drawer 29 in its first position.

In a variant, motor 1 might have continuously variable cubic capacity, for example of a type comprising a plurality of cylinders, with axes parallel to the axis of rotation, and an inclinable reaction plate with adjustable inclination. For a first range of angles of inclination of said plate, the driving torque obtained would be a low driving torque, and for a second range of angles of inclination of the plate, the driving torque obtained would be a high driving torque. The functioning of the radial piston motor which was described in detail hereinbefore is, of course, unchanged, whether the motor has radial pistons, or axial pistons and an inclinable reaction plate: the invention is therefore also applicable.

The invention is likewise applicable to motors of which the driven member is different from shaft 6 of the motor described hereinbefore. For example, the driven member is constituted, in certain motors, by the casing itself, the cylinder block being fixed. Such motors may comprise at least two cubic capacities and be integrated in assemblies according to the invention, comprising a brake and the characteristic features of the invention as set forth.

Furthermore, the brake-release chamber and the chamber containing the brake discs 50, 51 of the brake described are merged into one chamber. In a variant, these chambers may be distinct, without departing from the scope of the invention.

The invention is not limited to the embodiment described, but covers, on the contrary, all the variants which may be made without departing from the scope nor spirit thereof.

What is claimed is:

1. An assembly of a pressurized fluid motor having at least two distinct operational cubic capacities, said pressurized fluid motor comprising a driven member and a brake coupled to said driven member, said pressurized fluid motor being capable of being placed in two distinct configurations a first configuration corresponding to a large operational cubic capacity and, for a determined value of the pressure of the supply fluid, to a high driving torque, and a second configuration corresponding to a small operational cubic capacity, less than said large operational cubic capacity, and, for said determined value of the pressure of the supply fluid, to a low driving torque, less than said high driving torque, said pressurized fluid motor further comprising a cubic capacity selector having a mobile member with at least two positions, the first of the two positions placing the pressurized fluid motor in its first configuration and the second position placing it in the second configuration, said mobile member being coupled to a first elastic return means which tends to place it in its second position and to a first pressurized fluid jack capable of being supplied with fluid under pressure, whose effect is antagonistic of that of said first elastic return means, whilst the brake comprises a braking control device, which comprises at least two positions, and which is coupled, on the one hand, to a second elastic return means for return into braking position, on the other hand, to a second pressurized fluid jack, of antagonistic effect, comprising a braking-release chamber capable of being placed in communication with a source of fluid under pressure, said braking control member presenting two particular positions, a first corresponding to the action of braking and to the predominance of the return effect of the second elastic return means, and a second position corresponding to the effective placing in communication of the braking-release chamber with said source of fluid under pressure, to the predominance of the effect of the second jack and to braking-release control; wherein:

a) the mobile member of the cubic capacity selector is in addition coupled to a third pressurized fluid jack which is capable of being supplied with fluid under pressure and whose effect is antagonistic to that of said first jack; and b) the first jack and the braking-release chamber of the second jack are capable of being placed in communication with the same source of pressurized fluid;

whereby when the pressure of the fluid contained in the braking-release chamber is zero, the antagonistic efforts of the first elastic return means and the first jack place said mobile member in its second position, whatever the value of the pressure of the fluid of the third jack; and whereby when the pressure of the fluid contained in the braking-release chamber is equal to a nominal braking-release pressure which controls braking release, the antagonistic efforts of the first elastic return means and of the first jack, and of the third jack, then connected to an enclosure substantially without pressure, place said mobile member in its first position; and c) the immobilization torque of the driven member of the pressurized fluid motor, generated by the brake when the braking control member is placed in its first position, is greater than the maximum value of said low driving torque.

2. The assembly of claim 1, wherein:
   when the pressure of the fluid contained in the braking-release chamber is equal to a nominal braking-release pressure which controls braking release, the antagonistic efforts of the first elastic return means and of the first jack, and of the third jack, then connected to an enclosure under pressure, place said mobile member in its second position.

3. The assembly of claim 1, wherein said brake comprises a plurality of discs contained in a disc chamber, the braking-release chamber being constituted by the disc chamber itself.

4. The assembly of claim 2, wherein said brake comprises a plurality of discs contained in a disc chamber, the braking-release chamber being constituted by the disc chamber itself.

* * * * *